(12) United States Patent
Nishii et al.

(10) Patent No.: US 6,477,839 B2
(45) Date of Patent: Nov. 12, 2002

(54) HYDRAULIC BRAKE FOR A VEHICLE

(75) Inventors: Michiharu Nishii, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/927,375

(22) Filed: Aug. 13, 2001

(65) Prior Publication Data

US 2002/0026795 A1 Mar. 7, 2002

(30) Foreign Application Priority Data

Aug. 11, 2000 (JP) ........................................ 2000-243561
Jul. 5, 2001 (JP) ........................................ 2001-204225

(51) Int. Cl.[7] .............................. B60T 13/00; F15B 7/00
(52) U.S. Cl. ............................ 60/554; 60/575; 60/547.1
(58) Field of Search ............................... 60/547.1, 551, 60/552, 553, 554, 574, 575

(56) References Cited

U.S. PATENT DOCUMENTS 3,188,796 A * 6/1965 French et al. ............. 60/552 X
3,283,505 A * 11/1966 Julow et al. ............... 60/550 X
3,910,048 A   10/1975 Gardner
3,972,191 A *  8/1976 Grabb ........................... 60/553
4,199,948 A *  4/1980 Mathues et al. .............. 60/553
4,458,490 A *  7/1984 Newhouse ................. 60/547.1
4,565,067 A *  1/1986 Tani et al. ............. 60/547.1 X

* cited by examiner

Primary Examiner—John Ryznic
(74) Attorney, Agent, or Firm—Burns, Doane, Swecker & Mathis, LLP

(57) ABSTRACT

A hydraulic brake device for a vehicle includes a master piston, an auxiliary piston having first and second pistons, and an assisting device for assisting actuation of the master piston through the auxiliary piston. The brake pressure increase gradient in the assisting operation of the assisting device after the assisting output force of the assisting device reaches a maximum value is the same as the brake pressure increase gradient in the assisting operation of the assisting device before the assisting output force of the assisting device reaches the maximum value because the second piston of the auxiliary piston includes a large diameter portion possessing a diameter that is the same as the diameter of the master piston.

20 Claims, 6 Drawing Sheets

HYDRAULIC BRAKE FOR A VEHICLE

This application is based on and claims priority under 35 U.S.C. §119 with respect to Japanese Patent Application 2000-243561, filed on Aug. 11, 2000, and Japanese Patent Application 2001-204225, filed on Jul. 5, 2001, the entire content of both of which is incorporated herein by reference.

FIELD OF THE INVENTION

This invention generally relates to a hydraulic brake device. More particularly, the present invention pertains to hydraulic brake device in a vehicle that is provided with an assisting device for assisting master cylinder actuation in response to brake pedal operation.

BACKGROUND OF THE INVENTION

A known negative pressure booster or servo motor for use in a power braking system is disclosed in U.S. Pat. No. 3,910,048 issued in 1975. The servo motor includes a pressure ratio changer in which a first piston and a second piston supply a master cylinder with an operative force. The first piston is connected with a wall within the servo motor which is moved by a pressure differential across the wall. The second piston is concentrically positioned within the first piston to transmit an input force which operates a control valve to produce the pressure differential and also operates a hydraulic lock valve located within the master cylinder. As the first piston and the second piston move together in response to movement of the wall, hydraulic fluid flows into a locking chamber past the lock valve. When the output force capable of being generated by the pressure differential reaches a maximum value, the simultaneous movement of the first and the second pistons ceases. Further manual force input from the operator moves the second piston within the first piston to close the lock valve and hold the hydraulic fluid within the locking chamber to prevent the first piston from moving.

More specifically, as the first and the second pistons move forward, hydraulic pressure develops in the pressure chambers of the master cylinder. The output from the first and the second pistons follows a line (line 188 shown in FIG. 3 of U.S. Pat. No. 3,910,048) until the entire second chamber in the servo motor contains air at atmospheric pressure. At a particular point (point 190 in FIG. 3 of the aforementioned patent), the input force from the pedal is transmitted through a plunger and a sleeve to the second piston. This input force causes the second piston to independently move and permits a valve spring to close a hydraulic passage. As the second piston moves further, the output follows a different line (line 192 shown in FIG. 3 of the patent).

In the event a negative pressure is unavailable at the intake manifold, an input force applied to the brake pedal initially moves the second piston within the first piston to permit immediate closure of the hydraulic passage by the lock valve. The output from the second piston follows another line (line 196 shown in FIG. 3 of the patent) which exhibits a higher output than the characteristic line where both pistons are moved during a no power condition.

The servo motor for use in a power braking system disclosed in the aforementioned patent is configured to provide an output following the line 192 in FIG. 3 of the patent by enclosing the increased hydraulic pressure in the locking chamber in response to the movement of the second piston within the first piston after reaching the point 190. Even when the servo motor fails (e.g., a negative pressure is unavailable), the output can follow the line 196. To provide an output following the line, the servo motor serving as an assisting device needs to be configured for assuring a sufficient amount of movement of the second piston relative to the first piston. Accordingly, the structure of the known servo motor requires substantial change and an increase in the cost associated with the servo motor is unavoidable. Similarly, when the braking force is further increased after the output force of the servo motor reaches the maximum value, the structure of the known servo motor still needs to be changed.

A need thus exists for an improved hydraulic brake device for a vehicle having an assisting device that drives a master cylinder in response to a brake pedal operation.

It would be desirable to provide a hydraulic brake device for a vehicle that is able to assure a proper input-output performance after the output force of the servo motor reaches the maximum value in a manner that involves relatively minimal structural changes in the assisting device.

SUMMARY OF THE INVENTION

According to one aspect of the present invention, a hydraulic brake device for a vehicle includes a reservoir containing brake fluid, a master cylinder having a master piston for increasing a pressure of the brake fluid from the reservoir to supply pressure to a wheel cylinder in response to brake pedal depression, an assisting device for assisting the actuation of the master piston in response to the depression of the brake pedal, and an auxiliary piston provided rearward of the master piston and including first and second pistons. The assisting device includes a first output member for imparting an assisting output force of the assisting device passing through a reaction device and transmitted with an input force from the brake pedal passing through the reaction device. The assisting device also includes a second output member for imparting the assisting output force of the assisting device without passing through the reaction device. The first piston is operatively connected to the second output member of the assisting device and includes a first diameter portion having a diameter larger than that of the master piston. The second piston includes a first diameter portion having a diameter the same as that of the master piston and a second diameter portion smaller than the first diameter portion of the second piston. The second diameter portion of the second piston is provided in front of the first diameter portion of the second piston and has a diameter smaller than that of the master piston. The first diameter portion of the second piston is concentrically positioned in the first piston and the second diameter portion of the second piston is concentrically positioned in the master piston. The second piston is operatively connected to the first output member of the assisting device. A first hydraulic pressure chamber is provided between the first piston and the master piston and between the first diameter portion of the second piston and the master piston. A second hydraulic pressure chamber is provided between the second diameter portion of the second piston and the master piston. A first valve device interrupts hydraulic communication between the first hydraulic pressure chamber and the reservoir to hydraulically close the first hydraulic pressure chamber when actuation of the master cylinder by the assisting device is started. The first valve device also alternatively opens and closes hydraulic communication between the first hydraulic pressure chamber and the reservoir to decrease the hydraulic pressure in the first hydraulic pressure chamber in response to increasing the input force from the brake pedal when the input force from the brake pedal is further increased after the assisting output force of the assisting device reaches the maximum value. A second valve device hydraulically connects the second hydraulic pressure chamber with the first hydraulic pressure chamber when the hydraulic pressure in the first hydraulic pressure chamber is below a predetermined pressure less than a maximum hydraulic pressure generated by the assisting output force imparted from the assisting device to the first piston of the auxiliary piston. The second valve device also hydraulically closes the second hydraulic pressure chamber when the hydraulic pressure in the first hydraulic pressure chamber is above the predetermined pressure.

When the master piston is assisted through the auxiliary piston by the assisting device, the first hydraulic pressure chamber is hydraulically sealed by the first valve device. Then the auxiliary piston and the master piston are hydraulically connected. The brake pressure corresponds to the pressure in first and second hydraulic pressure chambers. After the pressure in the first hydraulic pressure chamber reaches the predetermined pressure, the second hydraulic pressure chamber can be hydraulically sealed. When the assisting output force of the assisting device reaches the maximum value, the first hydraulic pressure chamber is alternatively connected to and disconnected from the reservoir to decrease the pressure in the first hydraulic pressure chamber in response to an increase of the input force from the brake pedal, thereby causing a decrease of the force transmitted from the assisting device to the first piston of the auxiliary piston, and also causing an increase of the force transmitted from the assisting device to the second piston of the auxiliary piston so that the assisting operation of the assisting device is continued until the pressure in the first hydraulic pressure chamber is decreased at the atmospheric pressure. A brake pressure increase gradient in the assisting operation of the assisting device after the assisting output force of the assisting device reaches the maximum value corresponds to or is the same as the brake pressure increase gradient in the assisting operation of the assisting device before the assisting output force of the assisting deice reaches the maximum value, because the diameter of the second diameter portion of the second piston of the auxiliary piston corresponds to the diameter of the master piston.

The hydraulic brake device further includes a first hydraulic passage formed in the auxiliary piston for connecting the first hydraulic pressure chamber with the reservoir. The first valve device includes a first valve seat disposed in the first hydraulic passage, a first valve body adapted to be seated on or separated from the first valve seat for closing or opening the first hydraulic passage, a first biasing means always biasing the first valve body toward the first valve seat, and a brake input transmitting member for driving the first valve body in response to an increase of the input force from the brake pedal after the output force of the assisting device reaches the maximum value.

The hydraulic brake device also includes a second hydraulic passage formed in the auxiliary piston for connecting the second hydraulic pressure chamber with the first hydraulic pressure chamber. The second valve device includes a second valve body adapted to be alternatively seated on and separated from the second valve seat for alternatively closing and opening the second hydraulic passage, a second biasing means always biasing the second valve body toward the second valve seat, a pressure responsive member for moving the second valve body in a direction separated from the second valve seat in response to the pressure in the first hydraulic pressure chamber, and a third biasing means for always biasing the pressure responsive member toward the second valve body with a biasing force larger than that of the second biasing means.

The assisting device can be in the form of a negative pressure booster serving as a negative pressure assisting device or a hydraulic pressure booster serving as a hydraulic pressure assisting device.

According to another aspect of the invention, a hydraulic brake device for a vehicle includes a reservoir containing brake fluid, a master cylinder having a master piston for increasing a pressure of the brake fluid from the reservoir to supply brake pressure to a wheel cylinder in response to depression of a brake pedal, an assisting device for assisting actuation of the master piston in response to depression of the brake pedal, and an auxiliary piston provided rearward of the master piston. The assisting device includes a first output member for imparting an assisting output force of the assisting device passing through a reaction device and transmitted with an input force from the brake pedal passing through the reaction device, and a second output member for imparting the assisting output force of the assisting device without passing through the reaction device. The auxiliary piston includes first and second pistons, with the first piston including a first diameter portion having a diameter larger than that of the master piston and operatively connected to the second output member of the assisting device, and the second piston including a first diameter portion having a diameter the same as that of the master piston and a second diameter portion provided in front of the first diameter portion of the second piston. The second diameter portion of the second piston has a diameter smaller than that of the master piston, the first diameter portion of the second piston is concentrically positioned within the first piston, and the second diameter portion of the second piston is concentrically positioned within the master piston. The second piston is also operatively connected to the first output member of the assisting device. A first hydraulic pressure chamber is positioned between the first piston and the master piston and between the first diameter portion of the second piston and the master piston, and a second hydraulic pressure chamber is located between the second diameter portion of the second piston and the master piston. A first valve device controls hydraulic communication between the first hydraulic pressure chamber and the reservoir in response to operation of the brake pedal when actuation of the master piston by the assisting device through the auxiliary piston is started, and a second valve device controls hydraulic communication between the first hydraulic pressure chamber and the second hydraulic pressure chamber in response to hydraulic pressure in the first hydraulic pressure.

In accordance with another aspect of the invention, a hydraulic brake device for a vehicle includes a reservoir containing brake fluid, a master piston for increasing a pressure of the brake fluid from the reservoir in response to depression of a brake pedal, an assisting device for assisting actuation of the master piston in response to depression of the brake pedal, and an auxiliary piston provided rearward of the master piston. The assisting device includes a first output member for applying an assisting output force of the assisting device through a reaction member, and a second output member for imparting the assisting output force of the assisting device without passing through the reaction member. The auxiliary piston includes a first piston operatively connected to the second output member of the assisting device and a second piston operatively connected to the first output member of the assisting device. A first hydraulic pressure chamber is located between the first piston and the master piston, and a second hydraulic pressure chamber is located between the second piston and the master piston. A first valve device controls hydraulic communication between the first hydraulic pressure chamber and the reservoir in response to operation of the brake pedal when actuation of the master piston by the assisting device through the auxiliary piston is started, and a second valve device controls hydraulic communication between the first hydraulic pressure chamber and the second hydraulic pressure chamber in response to hydraulic pressure in the first hydraulic pressure. The hydraulic brake device also includes means for producing a brake pressure increase gradient in assisting operation of the assisting device after the assisting output force of the assisting device reaches the maximum value that is the same as the brake pressure increase gradient in assisting operation of the assisting device before the assisting output force of the assisting device reaches the maximum value.

BRIEF DESCRIPTION OF THE DRAWING FIGURES

The foregoing and additional features and characteristics of the present invention will become more apparent from the following detailed description considered with reference to the accompanying drawing figures in which like reference numerals designate like element and wherein.

DETAILED DESCRIPTION OF THE INVENTION

Figure 1:
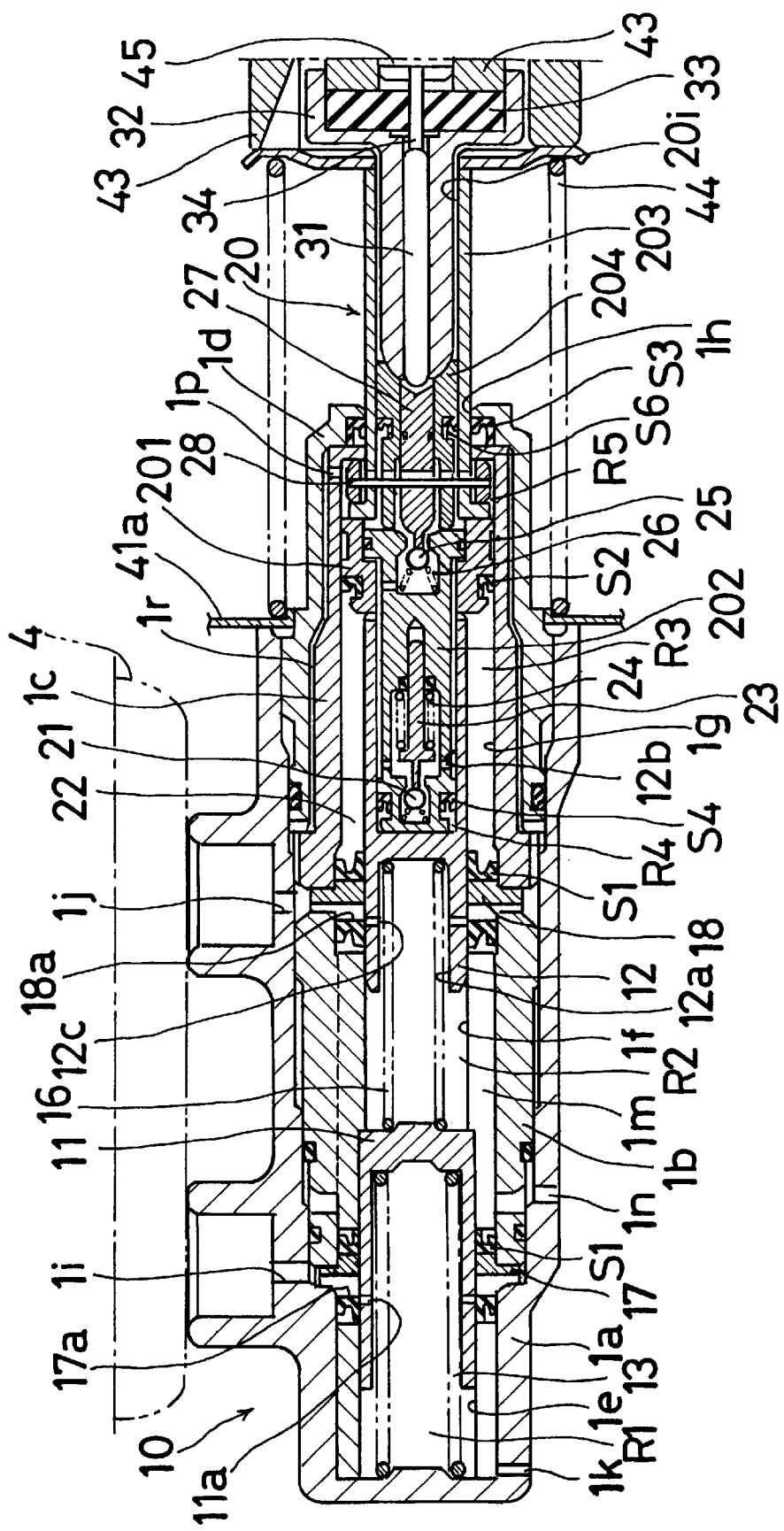
FIG. 1 is a cross-sectional view of a master cylinder portion of a hydraulic brake device according to an embodiment of the present invention.
Figure 2:
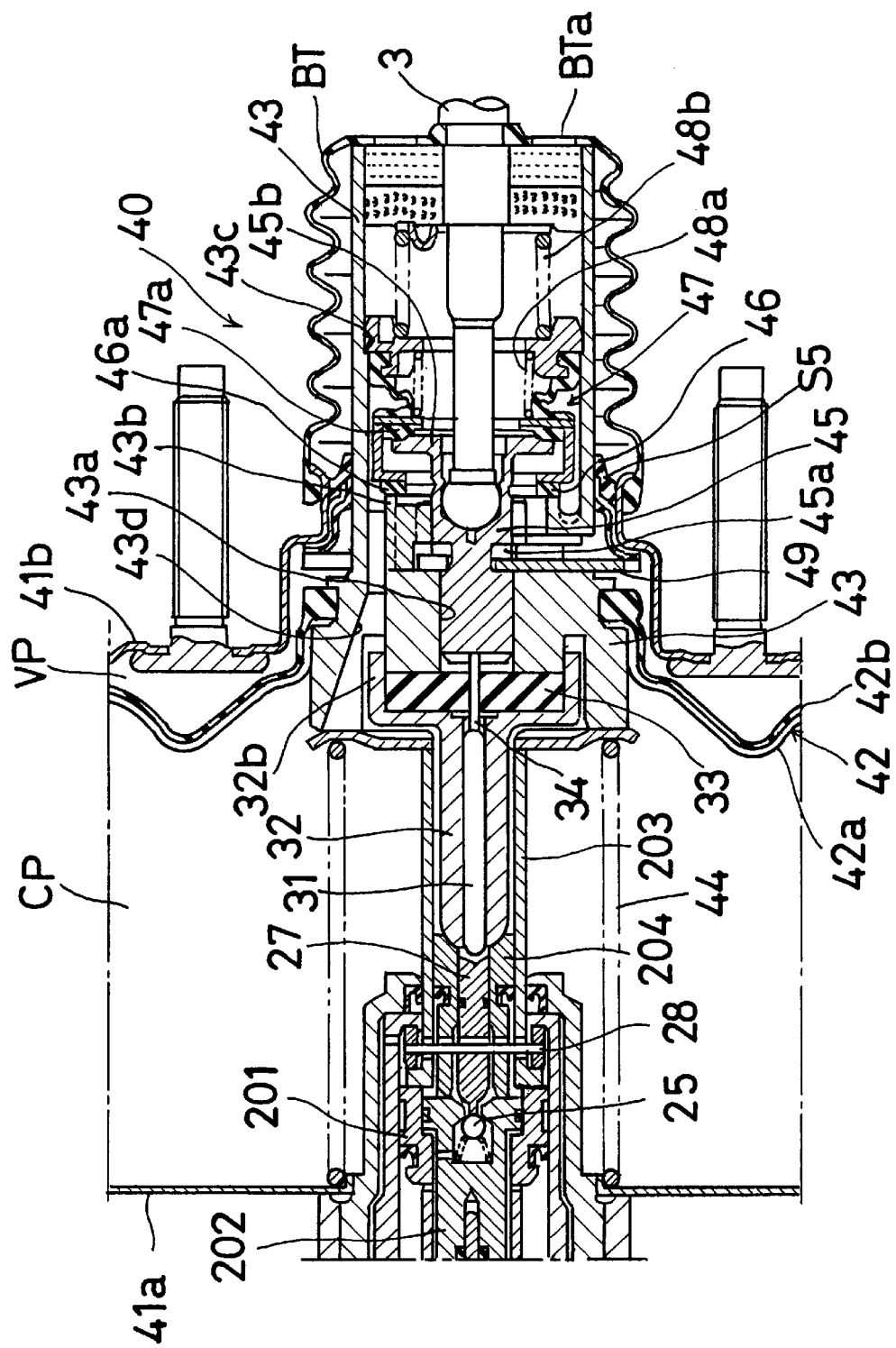
FIG. 2 is a cross-sectional view of a negative pressure booster portion of the hydraulic brake device according to the present invention.

The hydraulic brake device of the present invention includes a master cylinder 10 shown in FIG. 1 and a negative pressure booster or a vacuum booster 40 shown in FIG. 2. The hydraulic brake device is operatively associated with a brake pedal and the depressing force or operation force applied to the brake pedal is transmitted to an input rod 3 as an input force. In response to the application of an input force, brake pressure is supplied from the brake master cylinder 10 under the assistance of the negative pressure booster or a vacuum booster 40 to each of the wheel cylinders associated with each wheel of the vehicle.

As shown in FIG. 1, the master cylinder 10 includes a cylinder body having a first cylinder 1a, a second cylinder 1b accommodated in the first hcylinder, a third cylinder 1e, and a fourth cylinder 1d. A first piston 11 serving as a floating piston, a second piston 12 serving as a master piston and a third piston 20 serving as an auxiliary piston in the disclosed embodiment of the present invention are accommodated in series in the cylinder body. In the illustrated embodiment, the first piston 11 is positioned forward of the second and third pistons 12, 20.

The third piston 20 is constructed or comprised of four pistons 201, 202, 203, 204. The first cylinder 1a has a closed bottom portion at one end (i.e., the left end in FIG. 1) and is provided with a stepped bore. The diameter of the stepped bore gradually increases toward the open end of the bore (i.e., towards the right end in FIG. 1). The second cylinder 1b possesses an approximately cylindrical shape and includes a stepped bore defined by cylinder bore portions 1e, 1f having different diameters. A plurality of axially extending grooves 1m are formed in the inner peripheral surface of the second cylinder 1b.

Both the third cylinder 1c and the fourth cylinder 1d are generally cylindrical in shape, with the fourth cylinder 1d enclosing or surrounding the outer periphery of the third cylinder 1c so that an annular hydraulic passage (hydraulic chamber) 1r is formed between the third and fourth cylinders 1c, 1d. A cylinder bore 1g having a diameter larger than the diameter of the cylinder bore portions 1e, 1f is formed in the third cylinder 1c. A port 1p connected with the hydraulic passage 1r is formed in the peripheral portion of the third cylinder 1c. A bore 1h having the same diameter as that of the cylinder bore 1f, but smaller than the diameter of cylinder bore 1g, is formed at the bottom portion (i.e., the right end) of the fourth cylinder 1d.

The first cylinder 1a is provided with fluid supply ports 1i, 1j and output ports 1k, In. The output port 1k is connected with the cylinder bore 1e through the groove 1m and the output port 1n is connected with the cylinder bore 1f through the groove 1m.

An annular member 17 is arranged at the front end (i.e., the left end) of the second cylinder 1b located in the first cylinder 1a. The annular member 17 has a radially extending communicating hole 17a, and a cup-shaped sealing member S1 is positioned on both sides of the annular member 17. The cylinder bore 1e is adapted to communicate with the fluid supply port 1i through the communicating hole 17a.

An annular member 18 provided with a radially extending communicating hole 18a is arranged between the second cylinder 1b and the third cylinder 1c. A pair of sealing members S1 positioned between the second cylinder 1b and the third cylinder 1c are arranged on opposite sides of the annular member 18. The cylinder bore 1f is adapted to communicate with the fluid supply port 1j through the communicating hole 18a.

The first piston 11 having a bottom portion (i.e., a closed end ) is accommodated in the cylinder bore 1e and is slidably supported in a fluid-tight manner by the annular member 17. A pressure chamber R1 is defmed between the first cylinder 1a and the first piston 11. The second piston 12 is accommodated in the cylinder bore 1f and is slidably supported in a fluid-tight manner by the annular member 18. A pressure chamber R2 is defmed between the first piston 11 and the second piston 12. Rearward movement of the first piston 11 is restricted by a step between the cylinder bores 1e, 1f. At the rear end position under non-operated condition, a communicating hole 11a that is formed on a skirt portion of the annular member 17 faces the communicating hole 17a in the annular member 17 so that the pressure chamber R1 is connected with a reservoir 4 through the fluid supply port 1i.

A spring 13 is disposed between the front end surface (i.e., the left end surface) of the first cylinder 1a and the recessed base surface or closed bottom end of the first piston 11. The spring 13 always biases the first piston 11 in the rear direction (i.e., toward the right in FIG. 1). Each end of the second piston 12 is provided with a generally axially extending hollow portion 12a, 12b, with a central partition wall being formed between the two hollow portions 12a, 12b at an intermediate portion (e.g., approximately middle portion) of the second piston 12. A biasing force is always applied to the second piston 12 by a spring 16 that is disposed between the first and second pistons 11, 12. Under the non-operated condition, the rear end surface of the second piston 12 is biased in the rear direction so that the rear end surface of the second piston 12 contacts the front end surface of the piston 202 of the auxiliary piston 20. In this manner, the rearward movement of the second piston 12 is restricted in relation to the auxiliary piston or third piston 20.

Under the non-operated condition, because the communicating hole 12c formed on the second piston 12 faces the communicating hole 18a of the annular member 18, the pressure chamber R2 is connected to or in communication with the reservoir 4 through the fluid supply port 13. Further, a radially directed groove 12b (shown in FIG. 3) is formed at the rear end surface of the second piston 12 and is communicated with the hollow portion 12b of the second piston 12. As explained in more detail below, even when the second piston 12 is in contact with the front end surface of the piston 202 of the auxiliary piston 20, the connection or communication of the hydraulic passage with a hollow portion 20e (shown in FIG. 3) can be assured.

Figure 3:
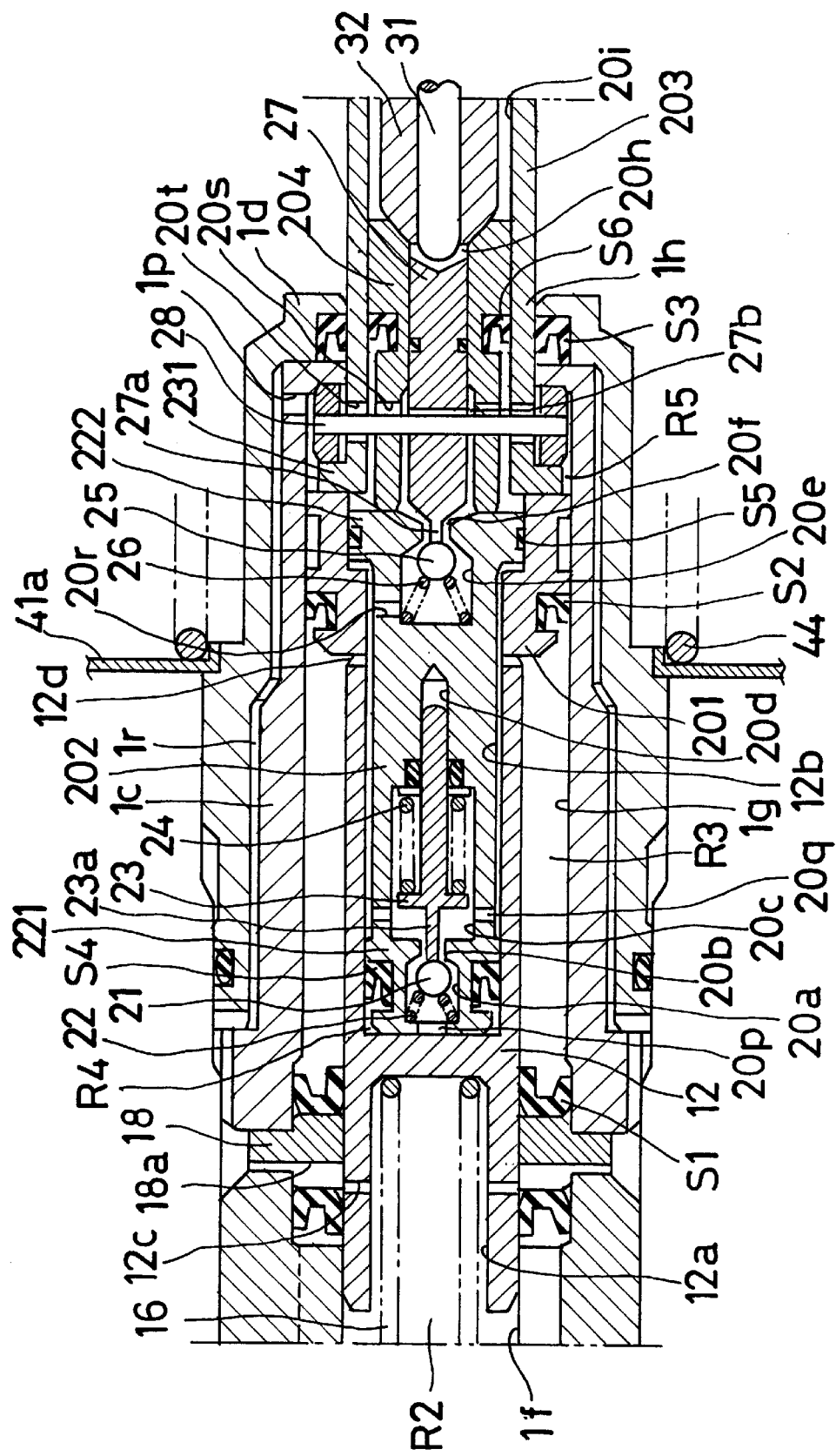
FIG. 3 is a cross-sectional view of an auxiliary piston portion of the master cylinder portion of a hydraulic brake device when the brake is not operated.

As shown in more detail in FIG. 3 and as mentioned above, the third piston or auxiliary piston 20 has a stepped cylinder body configuration comprising four pistons 201, 202, 203, 204. A number of hollow portions 20a, 20b, 20c, 20d, 20e, 20f, 20h, 20i, several communicating holes 20p, 20q, 20r and two radially extending and axially elongated holes 20s, 20t are provided in the pistons 201, 202, 203, 204. The piston 201 is provided with a stepped hollow portion including a smaller diameter portion having a diameter the same as that of the hollow portion 12b of the second piston 12 and a larger diameter portion having a diameter same as inner diameter of the annular members 17, 18. The piston 201 is also provided with a cup-shaped sealing member S2 located on the outer periphery of the piston 201 and is slidably supported in a fluid-tight manner by the third cylinder 1c. The piston 201 has an outer diameter larger than that of the second piston 12.

The piston 202 has a small diameter portion 221 located in the second piston 12 and having a diameter smaller than that of the second piston 12. The piston 202 also has a larger diameter portion 222 positioned rearwardly of the smaller diameter portion 221 and having a diameter the same as that of the second piston 12. The smaller diameter portion 221 of the piston 202 is provided with a cup-shaped sealing member S4 located on the outer periphery of the smaller diameter portion 221 and is slidably supported in a fluid-tight manner by the hollow portion 12b of the second piston 12. The larger diameter portion 222 of the piston 202 is provided with an annular sealing member S5 on its outer periphery and is slidably supported in a fluid-tight manner by the larger diameter hollow portion of the piston 201. Accordingly, a first hydraulic pressure chamber R3 is defined between the inner surface of the cylinder bore 1g and the outer surface of the second piston 12 and between the sealing members S1, S2 as shown in FIG. 3. The first hydraulic pressure chamber R3 is positioned between the second piston 12 and the piston 201 and the large diameter portion 222 of the piston 202. Also a fluid chamber R5 is defined in the cylinder bore 1g rearward of the pistons 201, 202. Further, a second hydraulic pressure chamber R4, which will be described in more detail below, is defined between the sealing member S4 and an inner surface of the hollow portion 12b of the second piston 12. The second hydraulic pressure chamber R4 is positioned between the second piston 12 and the small diameter portion 221 of the piston 202.

The hollow piston 203 is arranged rearward of the piston 201 and has a flange portion 231 at its front end for abutting the rear end of the piston 201. The piston 203 is supported in a fluid-tight and slidable manner in the bore 1h of the fourth cylinder 1d through a cup-shaped sealing member S3. The hollow piston 204 is provided with a cup-shaped sealing member S6 on its outer periphery and is accommodated in a fluid-tight and slidable manner in the piston 203.

A plunger 27 is accommodated in a fluid-tight and slidable manner in the piston 204. An axially extending pin 27a is formed integrally with the front end of the plunger 27. An axially elongated hole 27b is formed in the radial direction of the plunger 27. Axially elongated holes 20s are formed in the radial direction of the piston 203 and are aligned in the radial direction. Axially elongated holes 20t are formed in the radial direction of the piston 204 and are aligned in the radial direction. The axially elongated holes 20s, 20t communicate with the fluid chamber R5. A pin 28 is positioned in and extends through the elongated hole 27b of the plunger 27, the elongated holes 20s of the piston 204 and the elongated holes 20t of the piston 203. The pin 28 is axially movable in the holes over a predetermined distance. The pin 27a passes through the reduced diameter hollow portion 20f and extends into the hollow portion 20e.

As shown in FIGS. 1 and 2, the piston 203 is operatively connected to the forward end of a driving member 43 of the negative pressure booster 40. The forward end of the driving member 43 serves as a second output member of the assisting device. A first transmitting member 31 for transmitting an operational stroke of the brake pedal to the plunger 27 is accommodated in a second transmitting member 32 which is accommodated in the piston 203. The second transmitting member 32 imparts an assisting output force of the negative pressure booster 40 to the piston 204 passing through a reaction rubber disc 33. The second transmitting member 32 serves as a first output member of the assisting device, and the reaction rubber disc 33 serves as a reaction device of the assisting device.

The first transmitting member 31 is axially movable relative to the piston 203, and the second transmitting member 32 is axially movable relative to the piston 203 and the first transmitting member 31. The assisting output force of the negative pressure booster 40 is imparted from the driving member 43 to the piston 201 through the piston 203 and without passing through the reaction rubber disc 33. The second transmitting member 32 is also transmitted with an input force of the negative pressure booster 40 from the brake pedal through the reaction rubber disc 33. The first transmitting member 31 serves as a brake input transmitting member together with the plunger 27 and a pin 34.

The first transmitting member 31 has a rod-shaped configuration and includes a front end engageable with a rear end of the plunger 27 and a rear end operatively connected to a plunger 45 through the pin 34 passing through the reaction rubber disc 33. The second transmitting member 32 has a cylindrical shape and is provided at its rear end with an enlarged diameter portion in which is received the reaction rubber disc 33. The second transmitting member 32 has a front end engageable with the piston 204 and operatively connected at its rear end to the driving member 43 through the reaction rubber disc 33. Accordingly, the piston 202 is operatively connected to the second transmitting member 32 through the piston 204, and the plunger 27 is operatively connected to the plunger 45 through the first transmitting member 31 and the pin 34.

As shown in FIG. 3, a first valve device and a second valve device are provided in the third piston 20. The first valve device includes a spherical-shaped valve portion 25 and a spring 26 which are positioned in front of the pin 27a in the hollow portion 20e. The spherical-shaped valve portion 25 forms a first valve member while the spring 26 forms a first biasing means for biasing the valve portion 25 towards the reduced diameter hollow portion 20f (i.e., towards the right in FIG. 3) which forms a first valve seat. The valve portion 25 is thus biased to be seated on the hollow portion 20f. Accordingly, under a condition in which the brake is not operated, when the pin 28 is positioned as shown in FIG. 3, the valve portion 25 is in contact with the pin 27a of the plunger 27 and is separated from the hollow portion or the first valve seat 20f. When the pin 28 is positioned at the rear of the elongated holes 20s with the pin 27a being moved backward, the valve portion 25 is seated on the hollow portion or the first valve seat 20f. The hollow portion 20e is always connected with the first hydraulic pressure chamber R3 through the communicating hole 20r and the groove 12d. When the valve portion 25 is separated from the hollow portion 20f, the hollow portion 20e is connected with the reservoir 4 through the hollow portion 20f, the elongated holes 20s, the hydraulic chamber R5, the port 1p, and the hydraulic passage 1r. Accordingly, a first hydraulic passage is formed by various elements such as the hollow portion 20f.

The second valve device is provided in the small diameter portion 221 of the piston 202. As shown in FIG. 3, a plunger 23 has an intermediately located flange portion forming a pressure responsive member which is movably supported in the axial direction within the hollow portion 20C. The rear axially extending end portion of the plunger 23 is slidably supported within the hollow portion 20d of the third piston 20. The pin 23a is formed integrally with the plunger 23 at the front end. A pin 23a is formed integrally with the plunger 23 at the front end of the plunger 23. The pin 23a passes through the reduced diameter or small diameter hollow portion 20b and extends into the hollow portion 20a. A spherical-shaped valve portion 21 and a spring 22 are provided at the front portion of the pin 23a in the hollow portion 20a. The spherical-shaped valve portion 21 forms a second valve member while the spring 22 forms a second biasing means. The spring 22 biases the valve portion 21 toward the hollow portion 20b which forms a second valve seat.

A spring 24 constituting a third biasing means is provided between the flange portion of the plunger 23 and the bottom surface or end of the hollow portion 20c. The plunger 23 is biased toward the valve portion 21 by the spring 24 to separate the valve portion 21 from the hollow portion 20b. The force of the spring 24 is larger than that of the spring 22. Accordingly, as shown in FIG. 3, when the valve portion 21 and the plunger 23 are free, the spring 24 is not compressed and only the spring 22 is compressed. Accordingly, the valve portion 21 is separated from the hollow portion or second valve seat 20b.

The hollow portion 20c is always in communication with the first hydraulic pressure chamber R3 through the communicating hole 20q opening rearward of the sealing member S4 and the groove 12d. When the valve portion 21 is separated from the hollow portion 20b, the second hydraulic pressure chamber R4 is connected with the first hydraulic pressure chamber R3 through the communicating hole 20p and the hollow portions 20a, 20b, 20c. Accordingly, a second hydraulic passage is formed by elements such as the hollow portion 20p.

As shown in FIG. 2, the negative pressure booster 40 is provided with a pair of interconnected housing parts or shells (front and rear housing parts) 41a, 41b forming a housing in which is defined an interior that is divided by a movable wall 42. A constant pressure chamber (negative pressure chamber) CP is defined forwardly of the wall 42 in the interior of the housing while a variable pressure chamber VP is defined rearwardly of the wall 42 in the interior of the housing. The constant pressure chamber CP is connected with a negative pressure source such as an intake manifold through an inlet to maintain the constant pressure chamber CP under negative pressure.

The movable wall 42 is provided with a pressure receiving plate 42a and a diaphragm 42b. One opening end portion of the cylindrical driving member or power piston 43 is hermetically fixed in the middle or central portion of the movable wall 42. The other opening end portion of the driving member 43 extends rearward through the housing part 42b. The driving member 43 is slidably supported by the opening portion of the rear housing part 41b through a sealing member S5 and is enclosed by a boot BT. The boot BT is fixed to an input rod 3 and a communicating hole BTa is formed at the other open end portion of the driving member 43. A spring 44 is disposed between the front end portion of the driving member 43 and the inner surface of the front housing part 41a. The movable wall 42 is biased toward the rear housing part 41b by the spring 44.

The input rod 3 is provided along the axial central portion in the driving member 43. The forward end portion of the input rod 3 is connected with the plunger 45 through a ball joint. The plunger 45 is slidably supported by an axially extending communicating hole 43a formed in the driving member 43. A valve seat 43b is formed on the periphery of the communicating hole 43a. A first control valve mechanism 46 enclosing the valve seat 43b and biasing an annular valve portion 46a to be seated on the valve seat 43b is configured in the driving member 43. The first control valve mechanism 46 forms a control valve and includes a valve seat 45b at the rear end of the plunger 45. A second control valve mechanism 47 biasing an annular valve portion 47a to be seated on the valve seat 45b is connected with the first control valve mechanism 46. The second control valve mechanism 47 forms an air valve and includes the annular valve portion 47a in front of the cylindrical elastic member. The second control valve mechanism 47 is always biased toward the valve seat 43b by a spring 48a which is supported at its rear end. The rear end of the elastic member configuring the second control valve mechanism 47 is always biased toward the valve seat 43b by a spring 48b and is supported by a stepped portion 43c formed inside the driving member 43.

An annular small diameter portion 45a is formed at the rear of the sliding portion formed on the end of the plunger 45. A key member 49 is engaged with the small diameter portion 45a and is movable over a predetermined distance in the axial direction. The key member 49 limits forward movement of the plunger 45 relative to the driving member 43 over a predetermined stroke. The key member 49 extending from the outer periphery of the driving member 43 is engaged with the housing 41b in order to restrict backward axial movement of the plunger 45. Accordingly, the returning position of the movable wall 42 is defined.

A recess portion 43d is formed at the front of the driving member 43. The rear end portion 32b of the second transmitting member 32 is positioned in the recess portion 43d, with the reaction force rubber disc 33 being accommodated between the second transmitting member 32 and the driving member 43. The transmitting pin 34 is in contact with the rear end of the first transmitting member 31. The rear end of the transmitting pin 34 is in contact with the end surface of the plunger 45. The transmitting pin 34 passes through the reaction force rubber disc 33 and is movable in the axial direction.

Accordingly, with the negative pressure booster 40 being under the operated condition, the portion of the reaction rubber disc 33 facing the plunger 45 expands rearward and contacts the end surface of the plunger 45. The reaction force to the rear side in response to a reaction force of the second transmitting member 32 is added toward the plunger 45. The first control valve mechanism 46 and the second control valve mechanism 47 are controlled in response to a force difference between the reaction force and the operating force added to the input rod 3.

Figure 4:
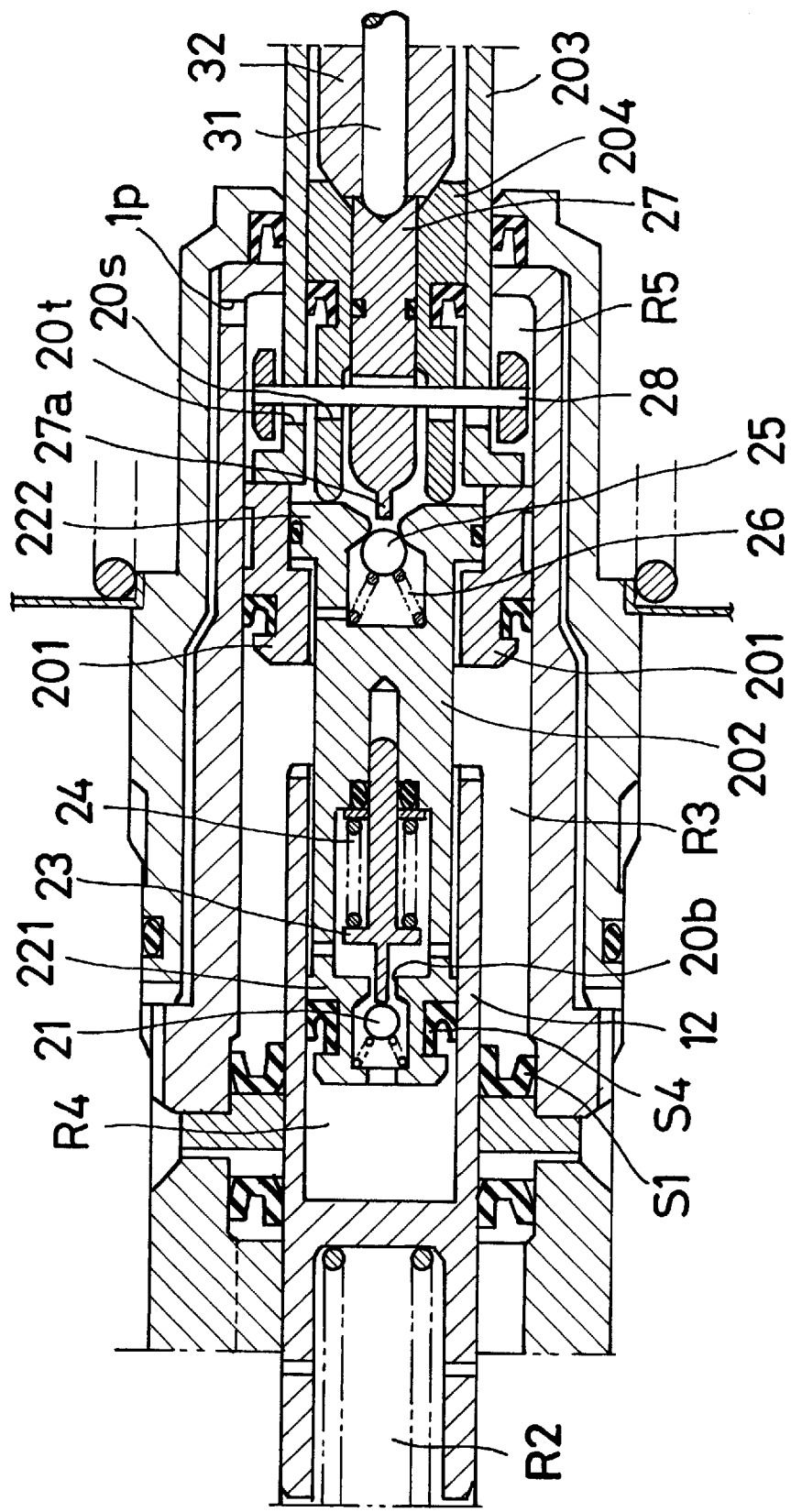
FIG. 4 is a cross-sectional view of the auxiliary piston portion under a condition in which assisting operation by the negative pressure booster is operated.
Figure 5:
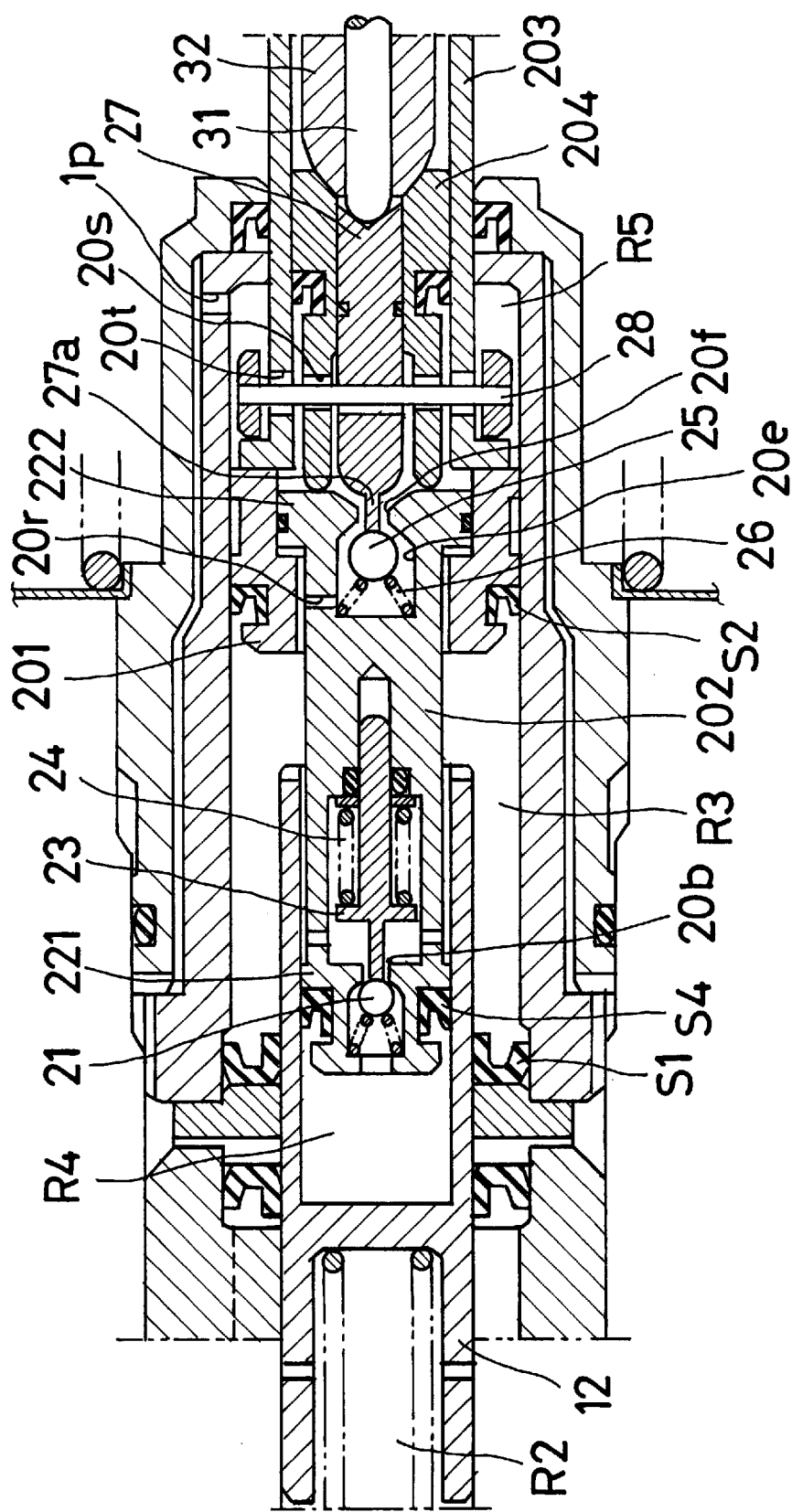
FIG. 5 is a cross-sectional view of the auxiliary piston portion under the condition in which the assisting by the negative pressure booster is beyond the assisting limit.
Figure 6:
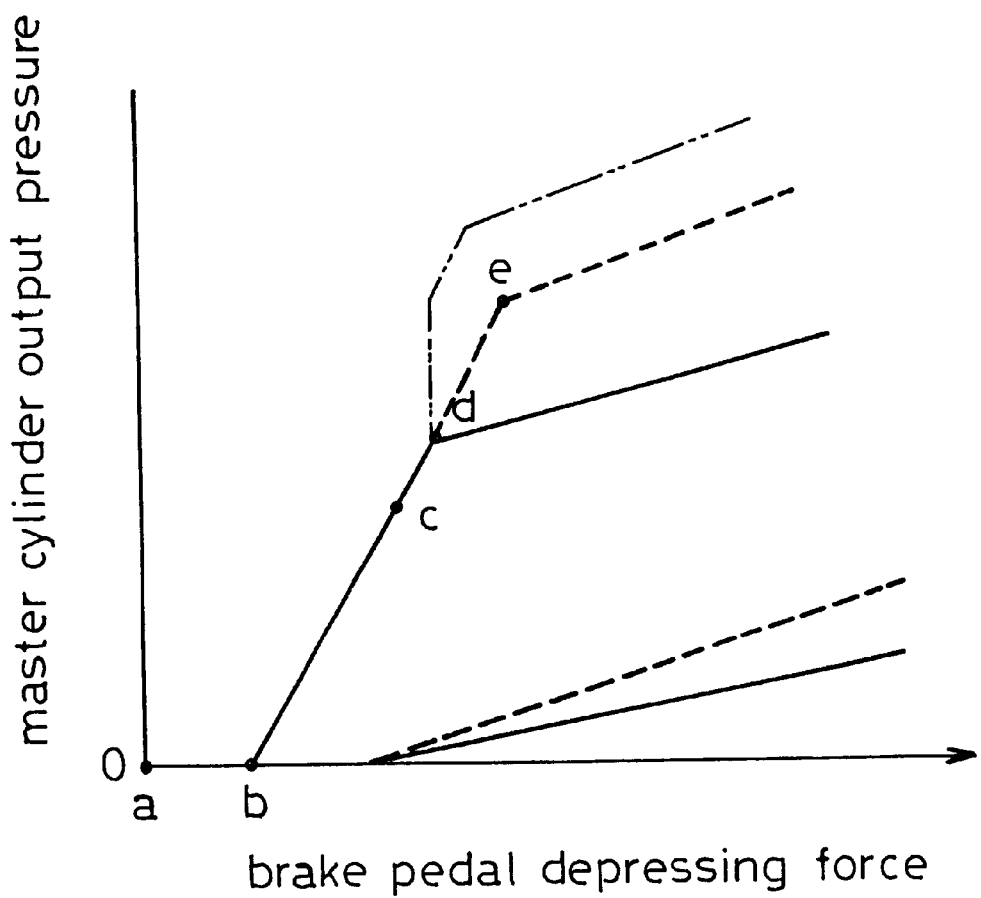
FIG. 6 is a graph showing the input-output performance associated with the present invention compared to a known device.

Referring now to FIGS. 1–5, the overall operation of the entire hydraulic brake device of the present embodiment is as follows. FIGS. 3–5 show the conditions of the first and the second valve devices and other components related to the hydraulic brake device. FIG. 3 shows the device in the non-operated condition from point "a" to point "b" on the input-output performance graph in FIG. 6. FIG. 4 shows the device in the operated condition from point "b" to point "c". FIG. 5 shows the device in the operated condition from point "d" to point "e". The graph shown in FIG. 6 represents the relationship between the depressing force applied to the brake pedal or the input force from the brake pedal and the outputting force (i.e., output brake pressure of the master cylinder 10). The upper solid line shows the performance characteristics when the negative pressure booster 40 is operated, and the lower solid line shows the performance characteristics of the conventional failure. The upper dashed line shows a performance characteristics under a condition in which the input force from the brake pedal is further increased after the assisting output force of the negative pressure booster reaches the maximum value, and the lower dashed line shows the performance characteristics under failure. In FIG. 6, when the brake pedal force is increased to point "d", the assisting output force of the negative pressure booster 40 reaches the maximum value.

When the brake pedal is under the non-operated condition, the various components maintain the positions shown in FIGS. 1–3. The rear end surface of the second piston 12 is in contact with the front end surface of the piston 201 of the auxiliary piston 20. Also, the first and the second valve mechanisms and other components maintain the positions shown in FIG. 3. In FIGS. 1–3, the first pressure hydraulic chamber R3 is connected with the hydraulic passage 1r through the groove 12d, the communicating hole 20r, the hollow portions 20e, 20f, the elongated holes 20s and the port 1p. When the negative pressure booster 40 is under the non-operated condition as shown in FIG. 2, the second control valve mechanism 47 closes the valve because the valve portion 47a is in contact with the valve seat 45b. The introduction of atmospheric air into the variable pressure chamber VP is thus interrupted. At this time, the first control valve mechanism 46 receives only the negative pressure in the constant pressure chamber CP. When the brake pedal is operated, each member starts operating. Each member maintains the position as shown in FIG. 3 from point "a" to point "b" in FIG. 6.

When the input rod 3 is pushed forward by the operation of the brake pedal and then the total of the operating force to the input rod 3 and the pushing force to the input rod 3 caused by the pressure difference between the variable pressure chamber VP and the atmospheric air becomes larger than the force of the spring 48b, the input rod 3 and the plunger 45 move forward. The valve portion 46a of the first control valve mechanism 46 contacts the valve seat 43b of the driving member 43 and the communication between the variable pressure chamber VP and the constant pressure chamber CP is interrupted. Then the valve portion 47a of the second control valve mechanism 47 is separated from the valve seat 45b and the pressure in the variable pressure chamber VP is increased because atmospheric pressure is introduced into the variable pressure chamber VP through the communicating hole BTa of the boot BT. Accordingly, the assisting output force biasing or urging the movable wall 42 forward is generated in response to the pressure differential between the constant pressure chamber CP and the variable pressure chamber VP. This assisting output force is imparted from the driving member 43 to the piston 201 through the piston 203 and is imparted also from the driving member 43 to the piston 202 through the reaction rubber disc 33, the second transmitting member 32 and the piston 204 so that the pistons 201, 203 are moved forward integrally, and the second piston 12, second transmitting member 32 and the piston 204 are moved forward integrally with respect to the plunger 27 to increase the brake pressure in the pressure chamber R2, and then the first piston 11 is moved forward to increase the brake pressure in the pressure chamber R1.

In this case, corresponding to the forward movement of the piston 202, the valve portion 25 contacts the hollow portion or first valve seat 20f by the force of the spring 26 so that the communication between the first pressure transmitting chamber R3 and the hydraulic passage 1r is interrupted or prevented. Accordingly, when the valve portion 25 is in contact with the hollow portion 20f, the first hydraulic pressure chamber R3 communicating with the second hydraulic pressure chamber R4 forms a hydraulically sealed space filled with brake fluid, and the second piston 12 and the auxiliary piston 20 are hydraulically connected. At this time, the diameter of the piston 201 of the auxiliary piston 20 is larger than that of the second piston 12 so that the second piston 12 moves forward in accordance with the forward movement of the auxiliary piston 20 relative to the auxiliary piston 20 and the volume of the second hydraulic pressure chamber R4 increases as shown in FIG. 4. In this condition, the second piston 12 and the auxiliary piston 20 differentially move forward to increase the brake pressure in the pressure chamber R2. When the auxiliary piston 20 is driven forward by the assisting operation of the negative pressure booster 40 under this condition, the pressure moving the valve portion 25 rearward (the pressure toward the hollow portion 20f) by the hydraulic pressure in the first hydraulic pressure chamber R3 is increased so that the valve portion 25 remains seated on the hollow portion 20f.

Accordingly, the auxiliary piston 20 is hydraulically combined with the second piston 12 through the brake fluid filled in the first pressure transmitting chamber R3 and the second pressure transmitting chamber R4. The auxiliary piston 20 and the second piston 12 differentially move forward, and the hydraulic pressure in response to the cross-sectional area of the auxiliary piston 20 is outputted to the wheel cylinders. In this manner, the assisting operation is carried out by the negative pressure booster 40 and the input-output performance at this stage is shown from point "b" to point "c" in FIG. 6.

When the brake pedal force is increased and the hydraulic pressure in the first hydraulic pressure chamber R3 is further increased beyond the predetermined pressure, the spring 24 is also compressed. Then the plunger 23 moves backward and the valve portion 21 contacts the hollow portion 20b.

Accordingly, the second hydraulic pressure chamber R4 becomes a hydraulically sealed space filled with pressure apply brake fluid, and the second piston 12 is hydraulically combined with the auxiliary piston 20. The second piston 12 and the auxiliary piston 20 differentially move under this condition because the sealing member S4 permits fluid flowing from the first hydraulic pressure chamber R3 into the second hydraulic pressure chamber R4. The input-output performance at this stage is shown from point "c" to point "d" in FIG. 6.

When the assisting output force of the negative pressure booster 40 reaches the maximum value (point "d" in FIG. 6) and the brake pedal is further depressed, the plunger 45, the transmitting pin 34, and the first transmitting member 31 move forward in response to the forward movement of the input rod 3 so that the front end surface of the first transmitting member 31 contacts the rear end surface of the plunger 27 as shown in FIG. 5. As a result, the valve portion 25 is separated from the hollow portion or first valve seat 20f by the pin 27a of the plunger 27. The first hydraulic pressure chamber R3 is thus once again connected with the hydraulic passage 1r and the reservoir 4 through the communicating hole 20r, the hollow portions 20e, 20f, the elongated holes 20s, and the port 1p so that the pressure in the first hydraulic pressure chamber R3 is thus decreased. This pressure decrease in the first hydraulic pressure chamber R3 causes a decrease in the force transmitted to the piston 201 from the negative pressure booster 40 and causes an increase in the force transmitted to the piston 202 through the piston 204 from the negative pressure booster 40. Accordingly, the piston 202 moves forward so that the piston 202 and the second piston 12 are integrally moved forward to increase the pressure in the pressure chamber R2, and the valve portion 25 once again contacts the hollow portion 20f. The first hydraulic pressure chamber R3 is again interrupted from the hydraulic passage 1r and the reservoir 4 so that the decrease of the pressure in the first hydraulic pressure chamber R3 is stopped. Thus the pressure in the first hydraulic pressure chamber R3 is decreased at a level in response to the magnitude of the depressing force of the brake pedal. At this time, because the pressure in the second hydraulic pressure chamber R4 is higher than that of the first hydraulic pressure chamber R3, the valve portion 21 maintains the condition in which the valve portion 21 is seated on the hollow portion or second valve seat 20b. The second hydraulic pressure chamber R4 maintains the hydraulically sealed space as shown in FIG. 5.

When the brake pedal is further depressed, the first transmitting member 31 moves forward so that the valve portion 25 is once again separated from the hollow portion or first valve seat 20f by the pin 27a of the plunger 27. The first hydraulic pressure chamber R3 is thus once again connected with the hydraulic passage 1r and the reservoir 4, the pressure in the first hydraulic pressure chamber R3 is further decreased, the force transmitted to the piston 201 from the negative pressure booster 40 is further decreased and the force transmitted to the piston 202 through the piston 204 from the negative pressure booster 40 is further increased. The piston 202 then moves forward so that piston 202 and the second piston 12 are integrally moved forward to increase the brake pressure in the pressure chamber R2 and then the first piston 11 is moved to increase the brake pressure in the pressure chamber R1. This operation (i.e., the force transmitted to the piston 201 from the negative pressure booster 40 is decreased while the force transmitted to the piston 202 through the piston 204 from the negative pressure booster 40 is increased in response to an increase of the depressing force of the brake pedal) is repeated in response to an increase in the depressing force of the brake pedal until the pressure in the first hydraulic pressure chamber R3 is decreased at atmosphere pressure level at which the force transmitted to the piston 201 from the negative pressure booster 40 is substantially zero and the entire assisting output force of the negative pressure booster 40 is transmitted to the piston 204 through the reaction rubber disc 33 together with the input force from the brake pedal. This operation causes the assisting operation by the negative pressure booster 40 to increase the pressure in the brake pressure chambers R1, R2 by moving the pistons 204, 202. At this time, because the pressure in the second hydraulic pressure chamber R4 is higher than that of the first hydraulic pressure chamber R3, the valve 21 maintains the condition in which the valve 21 is seated on the hollow portion or second valve seat 20b. The second hydraulic pressure chamber R4 maintains the hydraulically sealed space as shown in FIG. 5.

The brake pressure increase gradient in the assisting operation of the assisting device after the assisting output force of the assisting device reaches the maximum value corresponds to the brake pressure increase gradient in the assisting operation of the assisting device before the assisting output force of the assisting device reaches the maximum value because the diameter of the large diameter portion 222 of the second piston 202 of the auxiliary piston 20 corresponds to the diameter of the second piston (master piston) 12. As shown by the dashed line after point "d" in FIG. 6, the smooth input-output performance is exhibited without generating a sudden change to the brake pedal force. In the absence of the second valve device, when the assisting output force of the negative booster 40 reaches the maximum value as shown in FIG. 5, the pressure in the first and the second hydraulic pressure chambers R3, R4 becomes atmospheric pressure. Accordingly, the stroke of the brake pedal is suddenly increased and what is called entrapping of the brake pedal occurs. According to the illustrated and described embodiment of the present invention, entrapping of the brake pedal is reliably inhibited or prevented.

At point "e" in the performance graph of FIG. 6, the pressure in the first hydraulic pressure chamber R3 is decreased at the atmospheric pressure level. When the brake pedal is further depressed, the plunger 45 is mechanically connected to the driving member 43 by the key member 49 so that the plunger 45, the driving member 43, the reaction rubber disc 33, the second transmitting member 32, the piston 204 and the piston 202 are mechanically combined. At this time, because the pressure in the second hydraulic pressure chamber R4 is higher than that in the first pressure transmitting chamber R3, the valve 21 maintains the condition in which the valve 21 is seated on the hollow portion or second valve seat 20b. The second hydraulic pressure chamber R4 thus maintains the hydraulically sealed space as shown in FIG. 5.

When the negative pressure booster 40 fails, the first hydraulic pressure chamber R3 is connected with the reservoir 4 through the port 1p, the hydraulic passage 1r, and the port 1j and maintains the atmospheric pressure. When the input rod 3 moves forward in response to the operation of the brake pedal, the plunger 45 is mechanically connected to the driving member 43 by the key member 49 so that the plunger 45, the driving member 43, the reaction rubber disc 33, the second transmitting member 32, the piston 204 and the piston 202 are mechanically combined.

Accordingly, the auxiliary piston 20 and the second piston 12 are mechanically connected together and move forward integrally. The brake pressure outputted in this case is defined by the effective cross-sectional area of the second piston 12. The input-output performance in this condition is shown in FIG. 6 with the lower dashed line. Even when the negative pressure booster 40 fails, a pressure increase gradient can be increased as compared to the performance of a known device.

The piston 202 of the auxiliary piston 20 may be formed as a piston which includes a large diameter portion having an effective cross-sectional area larger than that of the second piston 12, and includes a small diameter portion provided in front of the large diameter portion and having an effective cross-sectional area smaller than that of the second piston 12.

As explained above, the hydraulic brake device of the present invention, utilizing a relatively simple construction, can smoothly increase the braking force even under a condition in which the input force from the brake pedal is increased after the assisting output force of the assisting device reaches the maximum as shown with the upper dashed line in FIG. 8. The proper braking force can thus be obtained. The upper chain line in FIG. 6 shows the performance characteristics in a case where the auxiliary piston 20 is constructed integrally. As shown in FIG. 6, the pressure increase gradient associated with the described and illustrated embodiment is constant or smooth (from point "b" to point "e" in FIG. 6).

Further, when the negative pressure booster 40 fails, the input-output performance characteristics shown as the lower dashed line in FIG. 6 can be obtained. Briefly stated, if the negative pressure booster 40 fails, a braking force larger than that associated with the known construction is outputted and the proper braking force can be obtained. Accordingly, one advantage associated with the hydraulic brake device described here is that it is able to ensure braking under emergency conditions. Accordingly, the braking operation can be smoothly maintained or achieved even when the negative pressure booster 40 fails. In this embodiment, because the first and the second valve devices are provided in the hollow portion of the auxiliary piston 20, the manufacturing and assembling can be easily made.

In the described and illustrated embodiment of the present invention, the negative pressure booster 40 is used as the assisting device. However, it is to be understood that any other hydraulic pressure assisting device, such as a hydraulic pressure booster or a pressure regulator, can also be used.

The illustrated and described embodiment of the present invention provides a number of advantageous results. For example, when the operation of the master cylinder piston is assisted through the auxiliary piston by the assisting device, the first hydraulic pressure chamber is hydraulically sealed by the first valve device. The pressure is increased by connecting the second hydraulic pressure chamber with the first hydraulic pressure chamber through the second valve device. After the pressure in the first hydraulic pressure chamber reaches a predetermined pressure, the second hydraulic pressure chamber is hydraulically sealed. When the input force from the brake pedal is further increased after the assisting output force of the assisting device reaches the maximum value, the first valve device alternatively establishes and interrupts hydraulic communication between the first hydraulic pressure chamber and the reservoir to decrease the hydraulic pressure in the first hydraulic pressure chamber in response to an increase of the input force from the brake pedal so that the actuation of the master cylinder is assisted by the assisting device. The brake pressure increase gradient in the assisting operation of the assisting device after the assisting output force of the assisting deice reaches the maximum value corresponds to or is the same as the brake pressure increase gradient in the assisting operation of the assisting device before the assisting output force of the assisting device reaches the maximum value, because the diameter of the large diameter portion of the second piston of the auxiliary piston corresponds to the diameter of the master piston.

When the assisting output is not operated by the assisting device, the first hydraulic pressure is connected with the reservoir through the first valve device. The second hydraulic pressure chamber is connected with the first hydraulic pressure chamber through the second valve device. Accordingly, by simply altering the structure of the master cylinder of a known hydraulic pressure brake device, the braking force can be increased smoothly under a condition in which the input force from the brake pedal is further increased after the assisting output force of the assisting device reaches the maximum value. Even when the assisting device fails, the proper input-output performance can be assured.

By virtue of the first and the second valve devices being configured as explained above, the structure of the valve devices can be mechanically formed. With this relatively simple structure, the proper input-output performance can be assured under a condition in which the input force from the brake pedal is further increased after the output force of the assisting device reaches at the maximum value and when the assisting device fails.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defmed in the claims, be embraced thereby.

What we claim is:

1. A hydraulic brake device for a vehicle, comprising:
   a reservoir containing brake fluid;
   a master cylinder having a master piston for increasing a pressure of the brake fluid from the reservoir to supply brake pressure to a wheel cylinder in response to depression of a brake pedal;
   an assisting device for assisting actuation of the master piston in response to depression of the brake pedal, the assisting device including a first output member for imparting an assisting output force of the assisting device passing through a reaction device and transmitted with an input force from the brake pedal passing through the reaction device, and a second output member for imparting the assisting output force of the assisting device without passing through the reaction device;
   an auxiliary piston provided rearward of the master piston and including first and second pistons, the first piston including a first diameter portion having a diameter larger than that of the master piston and being operatively connected to the second output member of the assisting device, the second piston including a first diameter portion having a diameter the same as that of the master piston and a second diameter portion provided in front of the first diameter portion of the second piston, the second diameter portion of the second piston having a diameter smaller than that of the master piston, the first diameter portion of the second piston being concentrically positioned within the first piston and the second diameter portion of the second piston being concentrically positioned within the master piston, the second piston being operatively connected to the first output member of the assisting device;

a first hydraulic pressure chamber between the first piston and the master piston and between the first diameter portion of the second piston and the master piston;

a second hydraulic pressure chamber between the second diameter portion of the second piston and the master piston;

a first valve device for interrupting hydraulic communication between the first hydraulic pressure chamber and the reservoir to hydraulically close the first hydraulic pressure chamber when actuation of the master piston by the assisting device through the auxiliary piston is started, and for alternatively establishing and interrupting hydraulic communication between the first hydraulic pressure chamber and the reservoir to decrease the hydraulic pressure in the first hydraulic pressure chamber in response to an increase of the input force from the brake pedal when the input force from the brake pedal is further increased after the assisting output force of the assisting device reaches a maximum value; and a second valve device for hydraulically connecting the second hydraulic pressure chamber to the first hydraulic pressure chamber when the hydraulic pressure in the first hydraulic pressure chamber is below a predetermined pressure less than a maximum hydraulic pressure in the first hydraulic pressure chamber generated by the output force imparted from the assisting device to the first piston of the auxiliary piston, and for hydraulically closing the second hydraulic pressure chamber when the hydraulic pressure in the first hydraulic pressure chamber is greater than the predetermined pressure.

2. The hydraulic brake device according to claim 1, further comprising:

a first hydraulic passage formed in the auxiliary piston for connecting the first hydraulic pressure chamber with the reservoir; and the first valve device including a first valve seat disposed in the first hydraulic passage, a first valve body adapted to be alternatively seated on and separated from the first valve seat for alternatively closing and opening the first hydraulic passage, a first biasing means always biasing the first valve body toward the first valve seat, and a brake input transmitting member for moving the first valve body to alternatively open and close the first hydraulic passage in response to increasing the input force from the brake pedal after the output force of the assisting device reaches the maximum value.

3. The hydraulic brake device according to claim 2, including a hydraulic chamber communicating with the reservoir and positioned rearward of the first and second pistons of the auxiliary piston, the first hydraulic passage communicating the first hydraulic pressure chamber with the hydraulic chamber.

4. The hydraulic brake device according to claim 2, wherein the brake input transmitting member includes a plunger having a forward end engageable with the first valve body, a rod member slidably disposed in the first output member of the assisting device, and a pin transmitting the input force from the brake pedal to the rod member.

5. The hydraulic brake device according to claim 2, wherein the assisting device includes a reaction member, and including a transmitting pin extending through the reaction member and being movable relative to the reaction member to contact the brake input transmitting member in response to the depression of the brake pedal when the input force from the brake pedal is further increased after the output force of the assisting device reaches the maximum value.

6. The hydraulic brake device according to claim 2, further comprising:

a second hydraulic passage formed in the auxiliary piston for connecting the second hydraulic pressure chamber with the first hydraulic pressure chamber; and a second valve device including a second valve seat disposed in the second hydraulic passage, a second valve body adapted to be alternatively seated on and separated from the second valve seat for alternatively closing and opening the second hydraulic passage, a second biasing means always biasing the second valve body toward the second valve seat, a pressure responsive member for moving the second valve body in a direction separated from the second valve seat in response to the pressure in the first hydraulic pressure chamber, and a third biasing means for always biasing the pressure responsive member toward the second valve body with a biasing force larger than that of the second biasing means.

7. The hydraulic brake device according to claim 1, including a hydraulic passage formed in the auxiliary piston for connecting the second hydraulic pressure chamber with the first hydraulic pressure chamber;

the second valve device including a valve seat disposed in the hydraulic passage, a valve body adapted to be alternatively seated on and separated from the valve seat for alternatively closing and opening the hydraulic passage, a spring always biasing the valve body toward the valve seat, a pressure responsive member for moving the valve body in a direction separated from the valve seat in response to the pressure in the first pressure transmitting chamber, and biasing means for always biasing the pressure responsive member toward the valve body with a biasing force larger than that of the second biasing means.

8. The hydraulic brake device according to claim 1, including a hydraulic passage formed in the auxiliary piston for connecting the second hydraulic pressure chamber with the first hydraulic pressure chamber;

the second valve device including a second valve seat disposed in the hydraulic passage, and a valve body adapted to be alternatively seated on and separated from the valve seat for alternatively closing and opening the hydraulic passage.

9. The hydraulic brake device according to claim 8, wherein the second valve device also includes a pressure responsive member for moving the valve body in a direction separated from the valve seat in response to the pressure in the first hydraulic pressure chamber, and a spring for always biasing the pressure responsive member toward the valve body.

10. The hydraulic brake device according to claim 1, wherein the assisting device is a negative pressure booster that includes a housing having an interior divided by a movable wall into a constant pressure chamber and a variable pressure chamber.

11. The hydraulic brake device according to claim 1, wherein the first valve device is adapted to establish hydraulic communication between the first hydraulic pressure chamber and the reservoir when the master cylinder is not actuated by the assisting device, and the second valve device is adapted to hydraulically connect the second hydraulic pressure chamber with the first hydraulic pressure chamber when the master cylinder is not actuated by the assisting device.

12. A hydraulic brake device for a vehicle, comprising:
a reservoir containing brake fluid;
a master cylinder having a master piston for increasing a pressure of the brake fluid from the reservoir to supply brake pressure to a wheel cylinder in response to depression of a brake pedal;
an assisting device for assisting actuation of the master piston in response to depression of the brake pedal, the assisting device including a first output member for imparting an assisting output force of the assisting device passing through a reaction device and transmitted with an input force from the brake pedal passing through the reaction device, and a second output member for imparting the assisting output force of the assisting device without passing through the reaction device;
an auxiliary piston provided rearward of the master piston and including first and second pistons, the first piston including a first diameter portion having a diameter larger than that of the master piston and being operatively connected to the second output member of the assisting device, the second piston including a first diameter portion having a diameter the same as that of the master piston and a second diameter portion provided in front of the first diameter portion of the second piston, the second diameter portion of the second piston having a diameter smaller than that of the master piston and smaller than the diameter of the first diameter portion of the second piston, the first diameter portion of the second piston being concentrically positioned within the first piston and the second diameter portion of the second piston being concentrically positioned within the master piston, the second piston being operatively connected to the first output member of the assisting device;
a first hydraulic pressure chamber between the first piston and the master piston and between the first diameter portion of the second piston and the master piston;
a second hydraulic pressure chamber between the second diameter portion of the second piston and the master piston;
a first valve device for controlling hydraulic communication between the first hydraulic pressure chamber and the reservoir in response to operation of the brake pedal when actuation of the master piston by the assisting device through the auxiliary piston is started; and
a second valve device for controlling hydraulic communication between the first hydraulic pressure chamber and the second hydraulic pressure chamber in response to hydraulic pressure in the first hydraulic pressure.

13. The hydraulic brake device according to claim 12, further comprising:
a first hydraulic passage formed in the auxiliary piston for connecting the first hydraulic pressure chamber with the reservoir; and
the first valve device including a first valve seat disposed in the first hydraulic passage, a first valve body adapted to be alternatively seated on and separated from the first valve seat for alternatively closing and opening the first hydraulic passage, a first spring always biasing the first valve body toward the first valve seat, and a brake input transmitting member for moving the first valve body to alternatively open and close the first hydraulic passage in response to increasing the input force from the brake pedal after the output force of the assisting device reaches the maximum value.

14. The hydraulic brake device according to claim 13, wherein the brake input transmitting member includes a plunger having a forward end engageable with the first valve body, a rod member slidably disposed in the first output member of the assisting device, and a pin transmitting the input force from the brake pedal to the rod member.

15. The hydraulic brake device according to claim 13, wherein the assisting device includes a reaction member, and including a transmitting pin extending through the reaction member and movable relative to the reaction member to contact the brake input transmitting member in response to the depression of the brake pedal when the input force from the brake pedal is further increased after the output force of the assisting device reaches the maximum value.

16. The hydraulic brake device according to claim 12, further comprising:
a second hydraulic passage formed in the auxiliary piston for connecting the second hydraulic pressure chamber with the first hydraulic pressure chamber; and
a second valve device including a second valve seat disposed in the second hydraulic passage, a second valve body adapted to be alternatively seated on and separated from the second valve seat for alternatively closing and opening the second hydraulic passage, a second spring always biasing the second valve body toward the second valve seat, a pressure responsive member for moving the second valve body in a direction separated from the second valve seat in response to the pressure in the first hydraulic pressure chamber, and a third spring for always biasing the pressure responsive member toward the second valve body with a biasing force larger than that of the second spring.

17. The hydraulic brake device according to claim 12, wherein the assisting device is a negative pressure booster that includes a housing having an interior divided by a movable wall into a constant pressure chamber and a variable pressure chamber.

18. The hydraulic brake device according to claim 12, wherein the first valve device and the second valve device each includes a valve seat and a valve portion engageable with and separable from the valve seat, the first valve device establishing hydraulic communication between the first hydraulic pressure chamber and the reservoir when the master cylinder is not actuated by the assisting device, and the second valve device hydraulically connecting the second hydraulic pressure chamber with the first hydraulic pressure chamber when the master cylinder is not actuated by the assisting device.

19. A hydraulic brake device for a vehicle, comprising:
a reservoir containing brake fluid;
a master piston for increasing a pressure of the brake fluid from the reservoir in response to depression of a brake pedal;
an assisting device for assisting actuation of the master piston in response to depression of the brake pedal, the assisting device including a first output member for applying an assisting output force of the assisting device through a reaction member, and a second output member for imparting the assisting output force of the assisting device without passing through the reaction member;

an auxiliary piston provided rearward of the master piston and including a first piston operatively connected to the second output member of the assisting device and a second piston operatively connected to the first output member of the assisting device;

a first hydraulic pressure chamber between the first piston and the master piston;

a second hydraulic pressure chamber between the second piston and the master piston;

a first valve device for controlling hydraulic communication between the first hydraulic pressure chamber and the reservoir in response to operation of the brake pedal when actuation of the master piston by the assisting device through the auxiliary piston is started;

a second valve device for controlling hydraulic communication between the first hydraulic pressure chamber and the second hydraulic pressure chamber in response to hydraulic pressure in the first hydraulic pressure; and means for producing a brake pressure increase gradient in assisting operation of the assisting device after the assisting output force of the assisting device reaches the maximum value that is the same as the brake pressure increase gradient in assisting operation of the assisting device before the assisting output force of the assisting device reaches the maximum value.

20. The hydraulic brake device according to claim 19, wherein the second piston includes a first diameter portion and a second diameter portion, the second diameter portion of the second piston being positioned in front of the first diameter portion of the second piston, the second diameter portion of the second piston having a diameter smaller than that of the master piston and smaller than the diameter of the first diameter portion of the second piston, said means including the first diameter portion of the second piston having a diameter the same as that of the master piston.

* * * * *